United States Patent [19]

Gibbs

[11] Patent Number: 4,833,382

[45] Date of Patent: May 23, 1989

[54] METHOD AND APPARATUS FOR USE IN MICROSCOPE INVESTIGATIONS

[76] Inventor: David L. Gibbs, 250 Mercer St., Suite A301, New York, N.Y. 10012

[21] Appl. No.: 871,531

[22] Filed: Jun. 6, 1986

[51] Int. Cl.4 .............................................. G05B 1/06
[52] U.S. Cl. .................................... 318/640; 356/152; 350/535
[58] Field of Search ........................ 318/640; 356/152; 350/535

[56] References Cited

U.S. PATENT DOCUMENTS

| | | |
|---|---|---|
| 1,824,097 | 9/1931 | Ott . |
| 1,876,176 | 9/1932 | Sulzner . |
| 1,996,141 | 4/1935 | Broadhurst et al. . |
| 2,148,908 | 2/1939 | Lory . |
| 2,279,412 | 4/1942 | Posada . |
| 2,474,163 | 6/1949 | Riley . |
| 2,574,522 | 11/1951 | Bennett . |
| 3,175,458 | 3/1965 | Costa . |
| 3,359,055 | 12/1967 | Krause . |
| 3,600,057 | 8/1971 | Leffler . |
| 3,622,856 | 11/1971 | Willis ................................... 318/640 |
| 3,712,740 | 1/1973 | Hennings ............................ 356/152 |
| 3,721,759 | 3/1973 | Lang . |
| 3,732,002 | 5/1973 | Wiesler et al. . |
| 3,738,730 | 6/1973 | Binnings et al. . |
| 3,851,972 | 12/1974 | Smith et al. . |
| 3,955,072 | 5/1976 | Johannsmeier ................. 318/640 X |
| 4,000,417 | 12/1976 | Adkisson et al. .................... 250/201 |
| 4,012,112 | 3/1977 | Masterson . |
| 4,189,953 | 2/1980 | Volk . |
| 4,190,314 | 2/1980 | Goldsmith . |
| 4,191,916 | 3/1980 | Zaiso et al. ......................... 318/640 |
| 4,223,257 | 9/1980 | Miller ................................... 318/594 |
| 4,248,498 | 2/1981 | Georges . |
| 4,338,024 | 7/1982 | Bolz et al. . |
| 4,367,915 | 1/1983 | Georges . |
| 4,442,388 | 4/1984 | Phillips ............................... 318/640 |
| 4,453,807 | 6/1984 | Faulkner et al. . |
| 4,503,555 | 3/1985 | Brimhall et al. . |
| 4,513,438 | 4/1985 | Graham et al. . |
| 4,519,087 | 5/1985 | Deindoerfer . |
| 4,667,335 | 5/1987 | Deindoerfer . |

FOREIGN PATENT DOCUMENTS

| | | |
|---|---|---|
| 2449245 | 4/1975 | Fed. Rep. of Germany . |
| 3222594 | 1/1983 | Fed. Rep. of Germany . |
| 3318959 | 12/1983 | Fed. Rep. of Germany . |
| 94901 | 1/1973 | German Democratic Rep. . |

Primary Examiner—Benjamin Dobeck
Attorney, Agent, or Firm—Darcy, Donovan & Coleman

[57] ABSTRACT

In a method for visually inspecting a sample through an objective lens of a microscope, a slide carrier attached to the microscope stage is automatically shiftable relative to a frame and to the stage along a predetermined meander path. A microscope slide and the slide carrier are provided with cooperating elements for positioning the slide at a predetermined position and orientation with respect to the carrier. The slide is further provided with a reference mark for enabling an automatic monitoring of the position of the slide relative to the frame of the carrier during an inspection of the slide. The x and y coordinates relative to the slide carrier frame of a detected microscopic object are recorded. On a later occasion, the detected object can be easily relocated by fixing the slide to the carrier in the predetermined fixed position and orientation, shifting the slide carrier so that the reference mark appears in the visual field of the microscope being used, setting this position of the slide as a reference position, and moving the slide as well as the slide carrier from that reference position in accordance with the previously recorded x and y coordinates.

23 Claims, 4 Drawing Sheets

METHOD AND APPARATUS FOR USE IN MICROSCOPE INVESTIGATIONS

FIELD OF THE INVENTION

This invention relates to a me and to an apparatus for making investigations with microscopes. More particularly, this invention relates to a method and apparatus usable with an optical microscope for visually detecting the presence of a microscopic object in a sample and determining the position of the object in the sample to enable repeated visual observation of the object.

In the visual inspection of samples exemplarily taken from the tissues or body fluids of a patient, it is customary to place a slide containing a sample in a slide carrier on a microscope stage and to manually shift the carrier so that the slide executes a meandering path below the lens system of the microscope. This movement has certain disadvantages. For example, inasmuch as the slide and slide carrier may be shifted too great a distance between adjacent parallel portions of the meandering path, it is likely that the technician or observer will fail to observe entire bands of the microscopic sample. Accordingly, in the event that a particular kind of microscopic object such as a virus or bacteria has a low rate of occurrence in the sample, its presence may go undetected. Similarly, again because the shifting of the slide and slide carrier is manually controlled, movement along portions of the meandering path may take place much more quickly than along other portions, whereby the accuracy and uniformity of the inspection are degraded.

In the conventional methods predominantly used to inspect microscopic slide samples, the exact location of a detected microscopic object in a sample is not recorded for purposes of facilitating future repeated observations of the object. This failure to record is due in part to a lack of a convenient means for exactly determining the position of the detected object and for relocating the measured position in the optical path of a microscope on a later occasion.

Methods and devices have been disclosed for obviating the necessity of completely repeating the inspection of a sample in order to re-locate a previously detected microscopic object. For example, U.S. Pat. No. 3,600,057 discloses a method and apparatus wherein a slide is divided into a specimen area and a reference area. Upon the positioning of the slide on a microscope stage for visually detecting selected object points within the specimen area, reference marks are applied to the reference area by a marking device to identify the position of each selected object point. Subsequently, the reference marks are alignable adjacent to an indicator device to readily re-locate the object points for further examination.

U.S. Pat. No. 4,190,314 is directed to a microscope slide having a multiplicity of spaced parallel reference lines. The distance between each adjacent pair of parallel lines corresponds to the diameter of the field of view obtained when utilizing a conventional microscope lens and eye piece combination. Accordingly, by maintaining a pair of adjacent reference lines in the field of view at opposite edges thereof throughout an entire longitudinal viewing traversal or pass, the viewer insures that the entire area of the sample between those two adjacent referenced lines will be inspected. Each pair of adjacent reference lines is provided at a margin of the slide with a respective reference numeral or letter identifying the strip or band defined by the reference lines, whereby a re-location of a detected microscopic object is facilitated.

U.S. Pat. No. 1,996,141 shows and describes a combination of microscope and slide wherein cooperating marks on the slide and reference lines on the microscope stage enable the re-location of a detected microscopic object in the optical axis of the microscope. The marks on the slide are disposed along the margins thereof, while the microscope stage has crossed lines intersecting at the optical axis of the microscope.

U.S. Pat. No. 4,012,112 discloses an automated scanning microscope system for automatically finding and focusing on white blood cells. The microscope system includes a stage positioning device wherein a slide carrier is automatically shiftable in a first direction by a first motor via a pair of screws and is automatically shiftable in a second direction orthogonal to the first direction by a second motor with a respective screw. The motors are associated with respective encoders in turn operatively connected to a microprocessor which controls the motion of the slide carrier and provides for automatic return thereof to stored coordinates so that an image may be viewed on different occasions. The microscope system includes a display for displaying coordinates of the slide carrier.

U.S. Pat. No. 3,851,972 also discloses a method and system for automatically inspecting microscope samples and identifying the characteristics of cells found therein. Slides are automatically fed from a storage rack to an analyzer station, samples on the slides are automatically scanned for identifiable cells, the slides are automatically returned to the storage rack and slide identities and locations of cells thereon are automatically stored for relocating the detected cells in an optical axis of microscope at a later time.

U.S. Pat. Nos. 4,248,498, 4,367,915 and 4,453,807 disclose further systems for the automatic positioning and examination of slides bearing microscopic samples.

Known automatic slide positioning devices are usually very expensive with respect to both installation and maintenance. Devices which are simpler and less expensive have the disadvantage of not being readily adaptable to existing microscopes. For these reasons and others, proposed automatic and semi-automatic positioning systems have failed to become widespread.

An object of the present invention is to provide an improved method and apparatus for visually detecting the presence of a microscopic object in a sample and for determining the position of the detected object in the sample enable a repeated visual observation thereof.

Another object of the present invention is to provide such a method and such an apparatus which are readily utilizable with existing microscopes.

Yet another object of the present invention is to provide such an apparatus which is inexpensive and easy to install and use.

Another, more particular, object of the present invention is to provide such an apparatus with a slide carrier which is easily mountable to the stages of most conventional optical microscopes and in which the carrier need not be positioned on a microscope stage in any particular position or orientation.

SUMMARY OF THE INVENTION

The present invention is directed in part to a combination of a microscope slide and a slide holder attachable to a stage of an optical microscope for shifting the slide to enable a visual inspection of a sample on the slide and a determination of the position of a detected microscopic object in the sample. The slide holder includes a frame stationary with respect to the stage and a slide carrier shiftable with respect to the frame and the stage upon a mounting of the slide holder to the stage. The slide is removably mountable to the carrier, while the microscope has a lens system with an optical path or axis.

In accordance with the invention, a motion control assembly is operatively connected to the slide carrier for automatically shifting the carrier with respect to the frame and to the microscope stage along a preprogrammed meander path. Cooperating elements are provided on the slide and the carrier for positioning the slide at a fixed position and orientation with respect to the carrier. A zeroing element is provided on the slide for establishing a reference position of the carrier and the slide with respect to the frame, the zeroing element taking the form of a reference mark permanently disposed on the slide and viewable by an observer through the lens system of the microscope upon a mounting of the slide to the carrier and upon an adjusting of the position thereof with respect to the microscope so that the reference mark is disposed substantially in the optical path. A monitoring device is operatively connected to the slide holder for measuring changes in the position of the carrier relative to the frame.

In accordance with the invention as set forth above, a detected microscopic object may be easily found again at a later time by mounting the slide to the carrier, or to another carrier on another microscope, positioning the reference mark in the optical path of the selected microscope, and operating the respective carrier to move the slide in accordance with a change in position detected by the monitoring device, this reference position having been recorded upon first locating the microscopic object. The combination of microscope slide and slide carrier in accordance with the invention has the advantage that the detected microscopic object may be located and re-located essentially independently of the orientation of the slide carrier with respect to the microscope stage, and independently of the orientation of any other slide carrier to which the microscope slide is later attached for again observing the detected microscopic object.

The present invention is also directed to a method for use with an optical microscope for visually detecting the presence of a microscopic object in a sample and determining the position of the detected object in the sample to enable repeated visual observation of the object. In accordance with the invention, a microscope object slide bearing the sample is provided, the slide having a structure cooperating with a slide carrier for mounting the slide to the carrier at a predeterminable fixed position and orientation with respect thereto, the carrier being movably attached to a slide holder frame in turn stationary with respect to a microscope stage. The slide is further provided with a zeroing element for establishing a reference position of the carrier and the slide with respect to the slide holder frame, and, concomitantly, with respect to the optical axis of a microscope. The zeroing element advantageously takes the form of a reference mark permanently disposed on the slide and viewable by an observer through the lens system of the microscope upon a mounting of a slide to the carrier and upon an adjusting of the position thereof with respect to the microscope so that the reference mark is disposed in the optical path of the microscope's lens system. The slide is mounted to the carrier so that the slide has the predeterminable fixed position and orientation with respect to the carrier. Subsequently, the position of the carrier relative to the slide holder frame and to the microscope is adjusted so that the reference mark is located in the optical path of the microscope's lens system and can be viewed by an operator therethrough. The carrier and the slide are then automatically shifted relative to the frame and to the microscope along a preprogrammed meandering path. During the motion of the slide along the meandering path, the sample is observed through the lens system to detect a presence of a microscopic object of a preselected kind in the sample. A change in the position of the slide and the carrier from the reference position upon the location of a microscopic object of the preselected kind in the optical path is automatically measured. The measured change in position is then recorded exemplarily in an electronic memory or on a print-out sheet.

DETAILED DESCRIPTION

Figure 1:
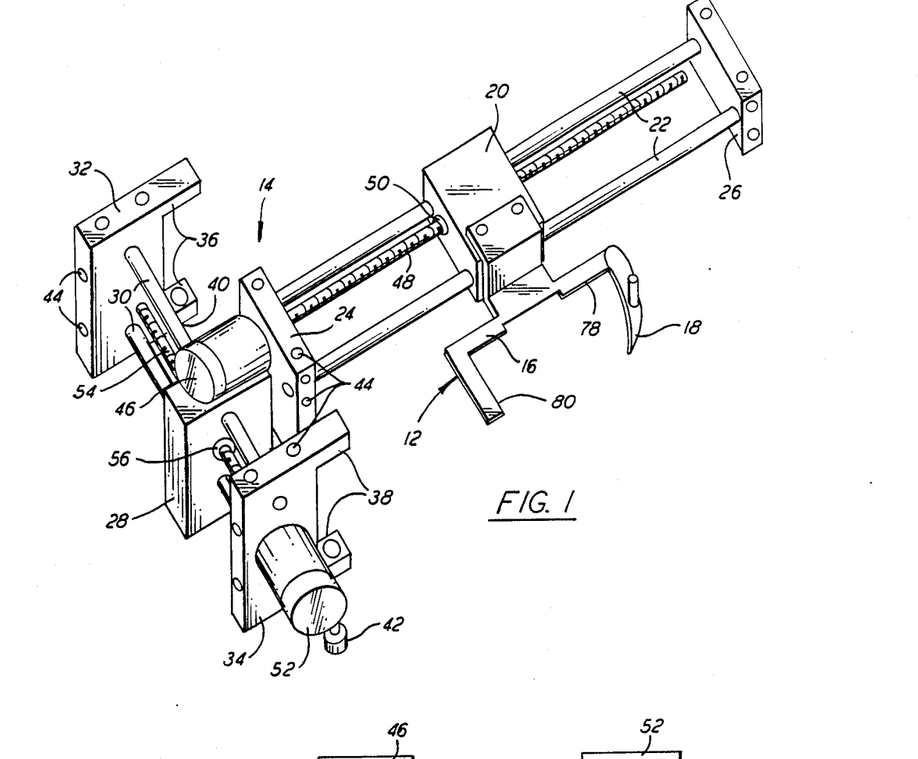
FIG. 1 is an isometric view of a mechanical slide shifting assembly used in the present invention.

As illustrated in FIG. 1, a device attachable to the stage of a microscope for holding a microscope slide 10 (see FIG. 3) and for shifting the slide relative to the microscope stage comprises a slide carrier 12 and a frame 14. Slide carrier 12 includes an L-shaped member 16 and a spring-loaded 15 clamping member 18 pivotably mounted at one end of L-shaped member 16 for cooperating therewith to hold a slide in a fixed position and orientation relative to carrier 12. Clamping member 18 carries a handle 19 in the form of a peg for facilitating the swinging of member 18 into an open position allowing the insertion of a slide.

Carrier 12 is fastened to a carriage 20 slidably mounted to frame 14 via a pair of parallel rails 22. One of the two rails 22 is rigidly mounted in a pair of support brackets 24 and 26, while the other rail is resiliently mounted thereto.

Support bracket or plate 24 is attached to another carriage 28 in turn slidably mounted to a pair of parallel rails 30 for motion in a direction perpendicular to the direction of motion of carriage 20 along rails 22. Rails 30 extend between a pair of end plates or brackets 32 and 34 each provided on one side with a respective pair of fingers 36 and 38 defining respective recesses for receiving an edge portion of a microscope stage. Two clamping screws 40 and 42 are each threaded to the lower members of finger pairs 36 and 38 for clamping frame 44 to a microscope stage.

End plates or brackets 24, 26, 32 and 34 are provided with threaded bores 44 for the attachment of cover plates (not illustrated).

Mounted to an upper surface of carriage 28 is an x-axis servo motor 46 with a built-in Hall-effect sensor (not illustrated) and a disc (not illustrated) with 15 magnetic spots. The rotor of motor 46 is connected to a threaded lead screw 48 which meshes with a threaded element 50 of carriage 20 for translating that carriage along guide rails 22.

A y-axis servo motor 52 is mounted to end bracket 34 and has a rotor connected to another elongate threaded lead screw 54 in turn meshing with a threaded element 56 of carriage 28, whereby that carriage is translatable along guide rails 30 through the action of motor 52. Like x-axis dc servo motor 46, y-axis dc servo motor 52 is provided with a built-in Hall-effect sensor and a disc with 15 magnetic spots detectable by the sensor for tracking the motion of the associated carriage.

Preferably, lead screws 48 and 54 each have approximately 40 threads per inch. Lead screws 48 and 54 are connected to the rotors of respective motors 46 and 52 by means of respective thrust bearings.

Carriages 20 and 28 are advantageously made of a synthetic resin material and are each provided with an anti-backlash nut and two linear bearings machined of a single block.

Figure 2:
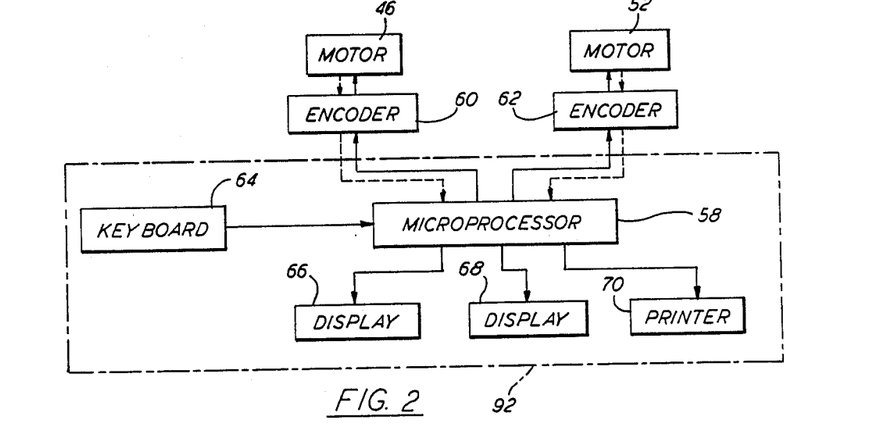
FIG. 2 is a block diagram of a control system for the slide shifting assembly of FIG. 1.

As illustrated in FIG. 2, motors 46 and 52 are controlled by a microprocessor 58 via respective encoders or peripheral interface adapters 60 and 62. As more fully described hereinafter, microprocessor 58 generates signals for controlling the energization of motors 46 and 52 in response to instructions from a keyboard 64. As indicated by dashed lines in FIG. 2, microprocessor 58 receives signals from the built-in Hall-effect sensor in motors 46 and 52 for monitoring the x-axis position of carriage 20 along rails 22 and the y-axis position of carriage 28 along rails 30. Microprocessor 58 is also connected at several outputs to a pair of displays 66 and 68 and a printer 70.

In accordance with the present invention, microscope slide 10 (FIG. 3) is provided with a reference mark 72 for establishing, upon a mounting of the slide to carrier or holder 12, a reference position of slide 10 and slide carrier 12 with respect to frame 14. Pursuant to the invention, the instantaneous x and y positions, relative to reference mark 72, of a point on the slide located in the optical path of a microscope are continuously tracked by microprocessor 58 by means of the signals received from the sensors in motors 46 and 52.

Figure 3:
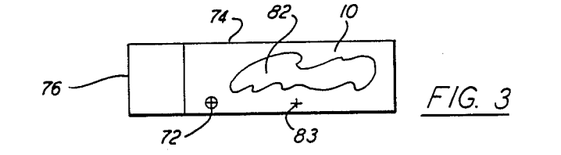
FIG. 3 is a plan view of a slide in accordance with the present invention.

Slide 10 has a pair of mutually perpendicular straight edges 74 and 76 engageable with respective inside edges 78 and 80 of slide carrier 12 for fixing the slide at a predeterminable fixed position and orientation with respect to the carrier. Slide 10 is mounted to carrier 12 by first pivoting spring-loaded clamping member 18 away from L-shaped member 16 (counterclockwise in FIG. 1), placing the slide so that edges 74 and 76 engage edges 78 and 80 and then pivoting clamping member 18 in the opposite direction to hold slide 10 against L-shaped member 12. Upon the mounting of the slide to slide carrier 12, the position of carrier 12 relative to frame 14 and the microscope stage to which frame 14 is attached is adjusted by microprocessor 58 in response to signals from keyboard 64 so that the reference mark 72 is located in the optical path of the lens system of the microscope and can be viewed by an operator through that lens system. In response to a signal from keyboard 64, microprocessor 58 automatically records or stores, as a reference position of slide 10 and slide carrier 12, the x position of carriage 20 along rails 22 and the y position of carriage 28 along rails 30. This recorded reference position serves as a standard against which subsequent movements of the carriages are measured.

As schematically illustrated in FIG. 3 slide 10 is provided with a sample 82 such as a smear of blood from a patient. In accordance with the invention, slide 10 is automatically moved along a meander path to enable a systematic, careful and complete visual inspection of sample 82 by an operator via the lens system of a microscope. Upon the detecting of a microscopic object of interest in sample 82, the relative positions of carriages 20 and 28 along rails 22 and 30, respectively, are stored in a non-volatile internal memory of microprocessor 58, shown on displays 66 and 68 (FIGS. 2 and 5) or printed on a sheet of paper by printer 70. In a preferred embodiment of the invention, position coordinates for a multiplicity of detected microscopic objects (e.g , 40) may be registered in a modular RAM component (e.g., in a card) which may be disconnected from microprocessor 58, stored and subsequently reconnected to the microprocessor. A slide can be successively shifted to a series of different positions by repeatedly actuating a keyboard button to read the encoded positions from the RAM card.

At some time subsequent to the removal of slide 10 from carrier 12, it may be desired to view again the microscopic object detected during the initial visual inspection. In this case, slide 10 is again secured to carrier 12 in the manner set forth above or to the carrier of an assembly identical to that of FIG. 1 on another microscope (e.g., in a different laboratory). In response to signals from keyboard 64, microprocessor 58 operates motors 46 and 52 to shift carriers 20 and 28 so that reference mark 72 appears in the optical path of the microscope to which the subject slide shifting assembly is attached. The x and y positions of carriages 20 and 28 are then recorded as a new reference position by the respective microprocessor 58. Subsequently, in response to signals from keyboard 64 encoding the previously measured position of the detected microscopic object, microprocessor 58 automatically translates carriages 20 and 28 via motors 46 and 52 to position slide 10 so that the detected microscopic object is located in the optical path of the microscope.

It is to be noted that, owing to the use of reference mark 72 and the computation of slide and carrier positions relative to frame 14, with an initial location of reference mark 72 in the optical axis of a microscope serving as a reference or standard position, a detected microscopic object may be located and relocated in the optical axis of one or more microscopes without regard to the orientation of rails 22 and 30 with respect to the microscope stages. Accordingly, a detected microscopic object can be repeatedly observed on different occasions and even in different facilities without a need for expensive equipment and complicated techniques.

Figure 4:
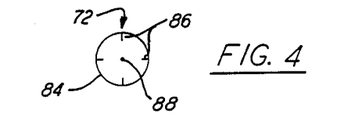
FIG. 4 is a diagram of a reference mark on the slide of FIG. 3.
Figure 5:
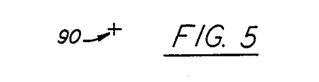
FIG. 5 is a diagram of a reference mark usable as an alternative to the reference mark of FIG. 4.

As illustrated in FIG. 4, reference mark 72 may comprise an outer circle 84 provided with radially and inwardly extending line segments 86 and a central pin point 88. Alternatively, as shown in FIG. 5, the reference mark may take the form of a pair of crossed line segments 90.

Figure 6:
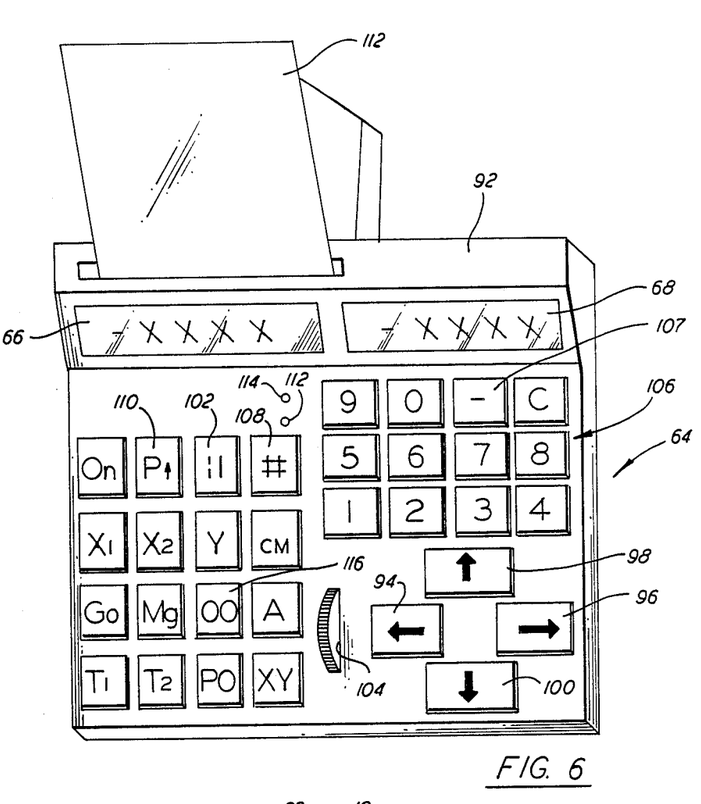
FIG. 6 is an isometric view of a control unit for a slide shifting system in accordance with the present invention.

The operation of the automatic slide shifting assembly illustrated in FIGS. 1 and 2 will now be described in detail with reference to FIGS. 6 and 7. As illustrated in FIGS. 2 and 6, a control unit 92 of an automatic slide shifting assembly in accordance with the present invention includes a plastic housing 94 containing microprocessor 58, keyboard 64, displays 66 and 68 and printer 70. Keyboard 64 includes a key labelled "ON" which serves to turn on the unit and to supply power to motors 46 and 52. If the ON key is pushed while control unit 92 is operating, the unit is de-energized. Keyboard 64 further includes four directional keys 94, 96, 98 and 100 which, when pushed, direct microprocessor 58 to move carriage 20 in one direction or the other along rails 22 or to move carriage 28 in one direction or another along rails 30. Keys 94, 96, 98 and 100 are used, for example, to shift slide 10 and carrier 12 so that reference mark 72 appears in the visual field of a microscope 20 to which the device of FIG. 1 is attached by means of clamping screws 40 and 42.

A button or finger pad 102 of keyboard 64 is used to determine whether the mode of x-axis motion of carriage 20 along rails 22 is continuous or stepped. In the continuous mode, the speed of carriage 20 during an x-axis sweep is smooth and at a substantially constant speed. In the stepped mode, motor 46 is energized with pulses, the distance that carriage 20 moves with each pulse being keyed to the distance that carriage 28 moves during a step along the y axis. The duration of the pauses between successive energization pulses supplied to motor 28 is determined by the setting of a speed control wheel 104. In the continuous mode, the setting of speed control wheel 104 determines the rate at which carriage 20 moves along rails 22. Each actuation of button 102 changes the motion mode from one to the other of the two modes.

Keyboard 64 includes a set of 11 numbered keys 106 in turn including one key 107 labeled with the symbol "—" (dash). These keys can be used to feed numerical values to microprocessor 58, for example, the x and y coordinates of a previously located microscopic object in a sample, these coordinates being determined with respect to reference mark 72, as described above. In an alternative mode of operation, numerical keys 106 may be used for counting the incidence of various microscopic bodies within a sample on a slide. Pursuant to this counting mode, each key may be paired with a respective kind of organism or other microscopic body.

Keyboard 64 is provided with a key 108 for changing the operation of numerical keys 106 back and forth between the numerical mode and the counting mode. During the counting mode, the tallies corresponding to the various numerical keys being used do not appear on displays 66 and 68. Instead, at any time that a talley of counts is desired, a key labelled "PO" is pressed to actuate printer 70 (FIG. 2) to print on a strip of paper 112 the number of counts recorded for each of the numerical keys 106 and the percentage of the total that each talley comprises. A key 110 included in keyboard 64 is used to advance paper strip 112 between successive printing operations.

Control unit 92 may be provided with a light 114 which indicates, when lit, that numerical keys 106 are operating in the counting mode. Control unit 92 is designed so that the x and y coordinates of a located microscopic object can be printed on paper strip 112 even when numerical keys 106 are operating in the counting mode.

Motors 46 and 52 may be energized by microprocessor 58 in response to the actuation of directional keys 94, 96, 98 and 100. Alternatively, motors 46 and 52 may be controlled by microprocessor 58 in an automatic scanning mode so that the path traced by carrier 12 and a microscope slide 10 held thereby is a meandering path consisting of a multiplicity of x-axis path portions parallel to rails 22, each pair of adjacent x-axis path portions being interconnected by a respective y-axis path segment parallel to rails 30. A key A is included in keyboard 64 for switching the scanning operation from a "manual" mode to the automatic mode. The manual mode may be entered from the automatic mode by pressing key A or any one of directional keys 94, 96, 98 and 100.

Control unit 92 is provided with a display light 114 for indicating, when lit, that the slide shifting assembly in accordance with the invention is operating in the automatic scanning mode.

The size of the y-axis path segment in the automatic scanning mode is calculated by microprocessor 58 in accordance with the magnification setting of the microscope being used, this setting being fed to microprocessor 58 via numerical keys 106. Keyboard 64 includes a key Mg for inducing the appearance on one of the displays 66 and 68 of the current magnification setting stored in microprocessor 58. If any of the numerical keys 106 are actuated while the current magnification setting is displayed, a new number setting corresponding to the entered digits will be memorized by microprocessor 58 and used to calculate a new y-axis path segment size for the automatic scanning mode, as well as the x-axis pulse field size for the stepped mode of motion of carriage 20.

Keyboard 64 includes three keys $X_1$, $X_2$ and Y used for setting the margins of the field scanned in the automatic scanning mode. Accordingly, one or the other of the two x-axis boundaries of the x-axis scan during the automatic scanning mode is set by moving carrier 12 so that the desired boundary is located in the optical axis of the microscope and by, at that juncture, pushing the respective x-axis endpoint key $X_1$ or $X_2$. The bottom margin of the meander path, i.e., the location of the last x-axis path portion, is communicated to microprocessor 58 by moving the carrier so that the desired lower margin is located in the optical field of the microscope and by then actuating key Y. Alternatively, the x and y boundaries or margins of the field scanned in the automatic scanning mode may be set by actuating a key C, typing in a number and then actuating a respective one of the margin setting keys $X_1$, $X_2$ or Y. As yet another alternative to setting the field size for the automatic scanning mode, the positions of the x margins may be defined by feeding to th microprocessor the location of a center line through the sample 82 relative to the x-axis and a measure of the distance of the x margins from that center line. The center line may be communicated to microprocessor 58 by moving the carrier 12 so that a center line mark 83 (FIG. 3) is located in the optical axis of the microscope and by, thereupon, pushing key X1. The common distance of the x margins from the center line may be communicated to microprocessor 58 by moving the carrier so that one of the margins appears in the optical axis of the microscope and by then depressing key X2.

Keyboard 64 is provided with a key CM for clearing the margins of the field covered in the automatic scanning mode. However, as set forth above, the margins need not be cleared prior to a resetting operation.

Prior to a slide scanning operation, as described above, directional keys 94, 96, 98 and 100 are used to move carrier 12 and a slide 10 held thereby so that reference mark 72 is located preferably approximately in the center of the microscope's visual field. Upon such a positioning of reference mark 72, a key 116 is actuated to induce microprocessor 58 to set the positions of carriages 20 and 28 at that time as references for further displacements of the carriages along rails 22 and 30. Upon subsequent actuations of key 116, microprocessor 58 automatically energizes motors 46 and 52 to position reference mark 72 in the center of the microscope's visual field. The reference positions of the carriages (and hence of carrier 12 and slide 10) can be reset, for example, by turning control unit 92 off (pushing the ON key), again turning the unit on (again depressing the ON key), shifting slide carrier 12 with respect to frame 14 and the microscope stage, and again pressing key 116.

Upon the setting of the reference positions via key 116 and the setting of the margins via keys $X_1$, $X_2$ and Y, the directional keys 94, 96, 98 and 100 may be used to place the slide in a starting position for an automatic scan. Key A is actuated to initiate the scanning operation. Upon the detection of a microscopic object of interest in the sample 82 (FIG. 3), key A or a directional key 94, 96, 98 or 100 is pressed in order to interrupt the automatic scanning. The directional keys may be used at this juncture to place the detected microscopic object in a desired position in the visual field, e.g. at the center of the field. Upon the pressing of a key XY included in keyboard 64, the x and x coordinates of the point on the slide located in the same position in the visual field that reference mark 72 was originally located during the setting of the carriage reference positions are shown on displays 66 and 68.

Upon the clearing of displays 66 and 68 by the actuation of key C, a slide identification number may be entered via numerical keys 106 and displayed upon display 66 or 68. The slide identification number may be printed on paper strip 112 by pushing button PO. Subsequently, upon the locating of a microscopic object of interest, and the display of the x and y coordinates of the detected object (presuming that the object is positioned at the same point in the visual field as reference mark 72 originally was), another actuation of key PO prints the x and y coordinates of the detected object on paper strip 112 proximately to the previously printed slide identification number.

On a later occasion the detected microscopic object may be easily relocated in accordance with the present invention, by mounting slide 10 to carrier 12, using directional keys 94, 96, 98 and 100 to position reference mark 72 at approximately the center of the microscope's visual field, pressing key 116 to set the reference position, clearing the displays by means of key C, entering the x and y coordinates of the detected microscopic object via the numerical keys 106, and actuating a key GO. In response to the actuation of key GO, microprocessor 58 energizes motors 46 and 52 to move carriages 20 and 28 so that the detected microscopic object appears in the microscope's visual field at approximately the same location as when it was originally detected. It is to be noted that the exact position of the detected microscopic object in the microscope's visual field upon the pressing of key GO depends upon the exact positioning of the reference mark 72 in the visual field at the beginning of the first inspection and at the beginning of the reinspection, as well as on the position of the detected object in the visual field when key XY was pushed to record the x and x coordinates of the object.

Keyboard 64 further includes two tab-setting keys $T_1$ and $T_2$, the pressing of which initiates tab-setting motions similar to those of a typewriter. Upon an actuation of key $T_1$, microprocessor 58 energizes motor 46 to shift carriage 20 to a predetermined position along rails 22. Motor 52 may also be energized in this operation. If the control unit 92 is already operating in an automatic scanning mode or if key A is pushed upon the relocation of carrier 12 and slide 10 pursuant to the actuation of key $T_1$, a meander scan is automatically performed at the new position. A subsequent actuation of key $T_1$ again shifts carriage 20 (and possibly carriage 28), as well as carrier 12 and slide 10, along the x-axis to another predetermined position.

An actuation of key $T_2$ will induce microprocessor 58 to move carriage 28 via motor 52 a predetermined distance along rails 30. Alternatively, key $T_2$ may be used for a different tab-setting shift along the x-axis. Keys $T_1$ and $T_2$ are particularly advantageous for scanning 8 or 12 position well slides.

Figure 7:
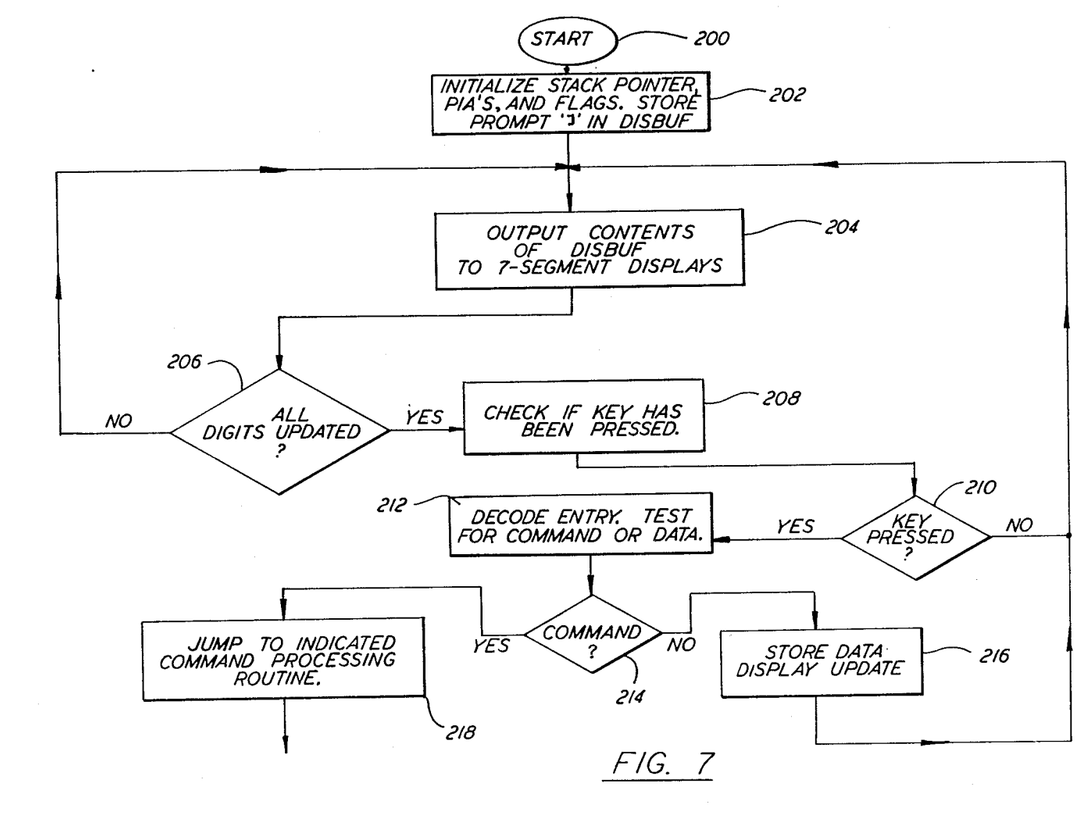
FIG. 7 is a flow chart diagram for a microprocessor shown in FIG. 2.

As illustrated in FIGS. 7, microprocessor 58 executes an initialization procedure 202 upon the energization of control unit 92 at 200. In initialization step 202, microprocessor 58 initializes a stack pointer, a plurality of peripheral interface adapters (included in microprocessor block 58 in FIG. 2), and flags. In addition, microprocessor 58 stores a prompt in a display buffer DISBUF (not illustrated). In a subsequent step 204, the contents of display buffer DISBUF are transmitted to the seven segment display sections of displays 66 and 68. Upon the updating of all the digits, detected by microprocessor at a decision junction 206, the microprocessor checks in a step 208 whether a key of keyboard 64 has been pressed. If a key has been pressed, as determined at a decision junction 210, microprocessor 58 decodes the entry in a step 212 and tests the entry as to whether it constitutes a command or data input. If the entry is a command, as determined by microprocessor 58 at a decision junction 214, the microprocessor jumps to the indicated command processing routine as indicated at 218. If, instead, the entry constitutes data, microprocessor 58 stores the data in an updating step 216.

Keyboard 64 preferably includes two arrays of mutually parallel wires defining a rectangular grid whereby the actuation of a key is detected by first testing each wire in one of the arrays and, upon discovering a closed circuit in one of the columns, testing for key closure in that one column by sequentially setting the wires of the other array at a low voltage and scanning the keyboard rows for a closed circuit. In view of the extensive use of microprocessors in the field of automated investigation of slide samples, as evinced exemplarily by U.S. Pat. Nos. 4,012,112 and 3,851,972, the implementation, in a computer program of the methods of the present invention will be readily apparent to one of ordinary skill in the art.

Figure 8:
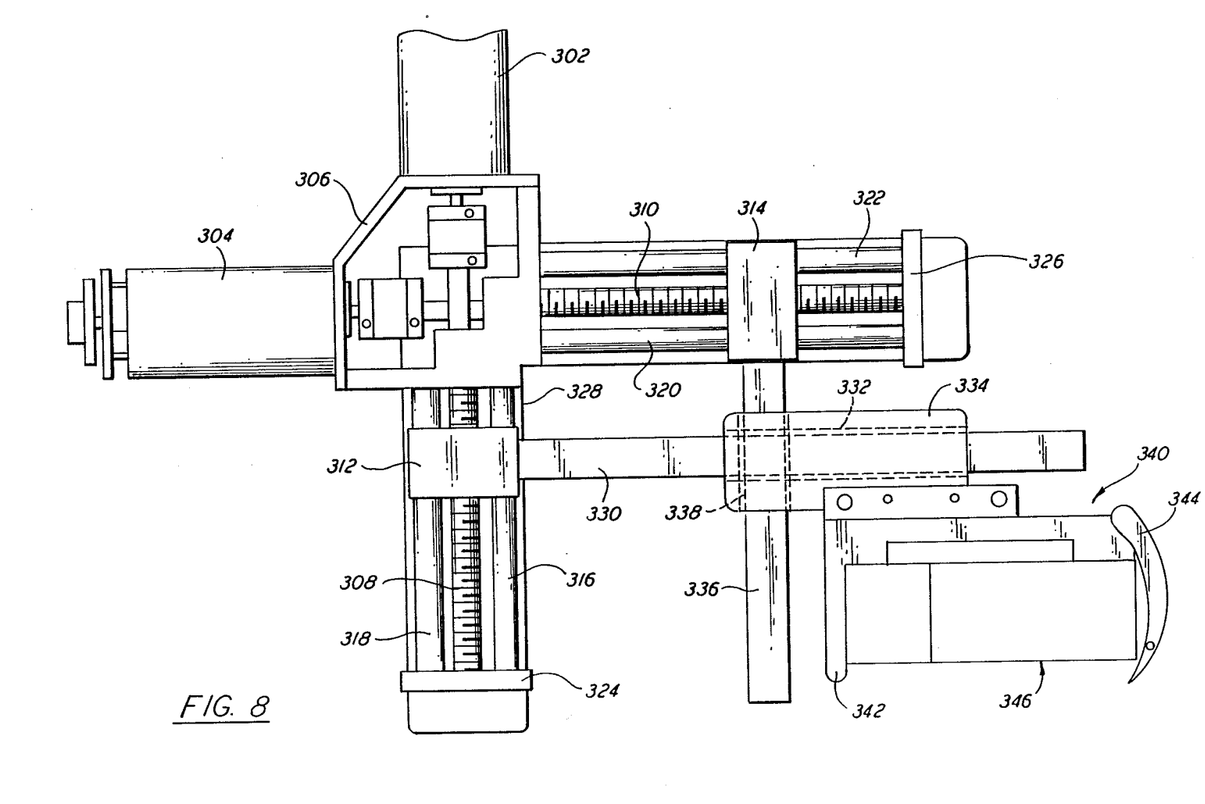
FIG. 8 is a plan view of another mechanical slide shifting assembly in accordance with the present invention.

As illustrated in FIG. 8, an alternative embodiment of a mechanical slide shifting assembly in accordance with the present invention comprises a pair of fixed d-c stepping motors 302 and 304 fastened to a motor mounting bracket 306. The motors drive respective lead screws 308 and 310 which in turn serve to translate a y-axis carriage 312 and an x-axis carriage 314, respectively. Y-axis carriage 312 is slidably secured to a first rigidly mounted rod 316 and a second rubber-mounted rod 318, which rods extend parallel to one another and to lead screw 308. Similarly, x-axis carriage 314 is slidably secured to a rigidly mounted shaft or rod 320 and to a rubber-mounted shaft or rod 322, shafts 320 and 322 extending parallel to one another at to lead screw 310. Rods 116 and 318 are each secured and one end to mounting bracket 306 and at an opposite end to a yoke or end piece 324, while shafts 320 and 322 are secured at one end to bracket 306 and at an opposite end to another yoke or end piece 326. Bracket 306 and end pieces 324 and 326 are fastened to an L-shaped base member 328.

Rigidly fixed to y-axis carriage 312 is an elongate bar 330 of rectangular cross section. Bar 330 extends in the x direction parallel to shafts 320 and 322 and traverses an elongate opening 332 of substantially identical cross-section in a slide carrier support member 334. Another elongate cross-sectionally rectangular bar 336 is rigidly fastened to x-axis carriage 314 and extends in the y direction parallel to rods 316 and 318. Bar 336 traverses an opening 338 in support member 334 of a cross-section substantially identical to that of bar 336. Support member 334 is slidably but firmly attached to bars 330 and 336 so that motion of y-axis carriage 12 results in a sliding motion of support member 334 along bar 336. Similarly, translation of carriage 314 in the x direction induces a parallel motion of support member 334 along bar 330. Simultaneous motions of carriages 112 and 313 give rise to a curvilinear motion of support member 334.

A slide carrier 340 is bolted to support member 334 and comprises an L-shaped element 342 provided at one end with a spring-loaded sickle-shaped clamping element 344. Clamping element 334 and L-shaped element 442 cooperate to hold a slide 346 in a viewing plane parallel to a microscope stage upon attachment of the microscope slide shifting assembly of FIG. 8 to the microscope stage. Slide 346 takes the form described hereinabove with respect to FIG. 3.

It is to be understood that the functions controlled by keyboard 106 may vary substantially from the functions described hereinabove with respect to FIG. 6 and yet meet the objects of the present invention. For example, microprocessor 58 may be programmed to respond to signals from key 108 so that an actuation of the key upon the completion of a tally removes the instrument from the tally mode and induces microprocessor 58 to print out a tally count, a total and a percentage of the total for each of the 11 numerical keys (including key 107). In addition, upon a clearing of the displays 66 and 68, the scan magnification may be entered into microprocessor 58 by typing in a magnification code number and then pressing magnification key Mg. By way of further example, a series of tab settings may be established upon the actuation of a tab setting key, by entering a 6-digit x-y coordinate, then pressing key 107, entering a second 6-digit x-y coordinate, again pressing key 107, and so forth. Upon finishing the series of tab settings, key 107 is actuated a predetermined plurality of times (e.g., three times). Actuating the tab key will move the slide the first location entered, subsequent actuations of the tab key moving the slide to the locations entered later in the series. The slide location may be printed out each time the slide is moved to a different location. Other tab setting numbers may be entered at the same time to preset the margins for the automatic scan.

Although the invention has been described in terms of particular embodiments and modifications, one of ordinary skill in the art, in light of this teaching, can generate additional embodiments and modifications without departing from the spirit of or exceeding the scope of the claimed invention. Accordingly, it is to be understood that the descriptions and illustrations herein are proffered by way of example to facilitate comprehension of the invention and should not be construed to limit the scope thereof.

What is claimed is:

1. A method used with an optical microscope for visually detecting the presence of a microscopic object in a sample and determining the position of said object in said sample to enable repeated visual observation of said object, said microscope having a microscope stage and an objective lens system with an optical path, said microscope being provided on said stage with a slide holder including a frame stationary with respect to said stage and a slide carrier movable with respect to said frame and said microscope, said method comprising the steps of:

providing a microscope object slide bearing the sample, said slide being provided with means cooperating with the carrier for mounting said slide to said carrier and for positioning said slide at a predeterminable fixed position and orientation with respect to said carrier;

mounting said slide to said carrier so that said slide has said predeterminable fixed position and orientation with respect to said carrier, said slide being provided with zeroing means for establishing a reference position of said carrier and of said slide with respect to said frame, said zeroing means including a reference mark permanently disposed on said slide and viewable by an observer through the lens system upon a mounting of said slide to said carrier and upon an adjusting of the position thereof with respect to said microscope so that said reference mark is disposed in the optical path of the lens system;

adjusting the position of said carrier relative to said frame and said microscope so that said reference mark is located in th optical path of the lens system of said microscope, thereby establishing said reference position, and can be viewed by an operator through said lens system automatically shifting said carrier and relative to said frame and said microscope along a preprogrammed meander path;

observing the sample through said lens system during the movement of said slide along said meander path to detect the presence of a microscopic object o a preselected kind in said sample;

automatically measuring a change in the position of said carrier and said slide from said reference position upon locating a microscopic object of said preselected kind in said optical path; and recording the measured change in the position of said carrier and said slide from said reference position upon locating a microscopic object of said preselected kind in said optical path, whereby the detected microscopic object may be located and relocated essentially independently of the orientation of said slide with respect to the microscope stage upon a mounting of said slide to the carrier.

2. The method defined in claim 1, further comprising the steps of removing said slide from said carrier, remounting said slide to said carrier, positioning said reference mark in the optical path of said lens system, and operating said carrier to move said slide in accordance with the recorded measured change in position detected by said monitoring means and recorded upon first locating the microscopic object, whereby said detected microscopic object is positioned in said optical path to enable visual inspection of said object.

3. The method defined in claim 2 wherein the location of said detected microscopic object is recorded in a electronic memory.

4. The method defined in claim 2 wherein the location of said detected microscopic object is recorded in a printed form.

5. The method defined in claim 1, further comprising the steps of (a) removing said slide from said carrier, (b) mounting said slide to another slide holder attached to a microscope stage of another microscope, said other microscope having a respective lens system with a respective optical path, said other slide holder including another frame stationary with respect to said other microscope and another carrier movable with respect to said other frame, (c) adjusting the position of said other carrier relative to said other frame and said other microscope so that said reference mark is located in the optical path of the lens system of said other microscope and can be viewed by an operator through the lens system thereof, and (d) substantially automatically shifting said other carrier to move said slide in accordance with the recorded measured change in position detected by said monitoring means and recorded upon first locating the microscopic object, whereby said detected microscopic object is positioned in the optical path of said other microscope to enable visual inspection of said object.

6. The method defined in claim 5 wherein the location of said detected microscopic object is recorded in an electronic memory.

7. The method defined in claim 5 wherein the location of said detected microscopic object is recorded in a printed form.

8. The method defined in claim 5 wherein the carriers are structurally and functionally identical devices.

9. The method defined in claim 1 wherein the movement of said carrier is controlled by a preprogrammed device, further comprising the step of feeding information to said preprogrammed device for defining parameters of said meander path prior to operating said carrier to move said slide.

10. The method defined in claim 9 wherein the information fed to said preprogrammed device serves to define boundaries of said meander path.

11. The method defined in claim 10 wherein said the information fed to said preprogrammed device serves to define an extent of said meander path about a center mark spaced o said slide from said reference mark.

12. The method defined in claim 1 wherein said slide carrier executes a continuous motion along said meander path.

13. The method defined in claim 1 wherein said slide carrier executes a stepped motion along said meander path.

14. A method of visually inspecting a sample through an objective lens of microscope having a microscope stage, comprising the steps of:

mounting, to an automatically shifting slide carrier in turn mounted to the microscope stage, a microscope object slide carrying the sample and provided with exactly one essentially permanent x-y coordinate system reference mark integral with said slide and separate from said sample;

adjusting the position of said slide carrier relative to said microscope so that said reference mark is located in the optical path of the lens system of said microscope, thereby establishing an x-y coordinate system reference position of said carrier and said slide, and can be viewed by an operator through said lens system;

upon executing said step of adjusting, automatically moving said slide carrier from said reference position a first predetermined distance along a first axis and a second predetermined distance along a second axis substantially orthogonal to said first axis so that a preselected location on said slide is positioned in said optical path and can be viewed by an operator through said lens system; and observing a microscope object at said predetermined location in the sample through said lens system upon movement of said slide carrier through said first predetermined distance and said second predetermined distance.

15. A method used with an optical microscope for visually detecting the presence of a microscopic object in a sample and determining the position of said object in said sample to enable repeated visual observation of said object, said microscope having a microscope stage and an objective lens system with an optical path, said method comprising the steps of:

providing a microscope object slide bearing the sample;

attaching, to the microscope stage, slide holding means including a frame and a movable slide carrier for shifting said slide along a preprogrammed meander path to enable a visual inspection of said sample, said frame being stationary with respect to said stage and said carrier being automatically shiftable with respect to said frame and said stage, said slide and said carrier being provided with cooperating means for mounting said slide to said carrier and for positioning said slide at a predeterminable fixed position and orientation with respect to said carrier;

mounting said slide to said carrier so that said slide has said predetermined fixed position and orientation with respect to said carrier, said slide being provided with zeroing means for establishing an x-y coordinate system reference position of said carrier and said slide with respect to said frame, said zeroing means including an x-y coordinate system reference mark integral with and essentially permanently disposed on said slide and separate from said sample and viewable by an observer through the lens system upon a mounting of said slide to said carrier and upon an adjusting of the position thereof with respect to said microscope so that said reference mark is disposed in the optical path of the lens system;

adjusting the position of said carrier relative to said frame and said microscope so that said reference mark is located in the optical path of the lens system of said microscope, thereby establishing said reference position, and can be viewed by an operator through said lens system;

automatically shifting said carrier and said slide relative to said frame and said microscope along a predetermined meander path;

observing the sample through said lens system during the movement of said slide along said meander path to detect the presence of a microscopic object of a preselected kind in said sample;

automatically measuring a change in the position of said carrier and said slide from said reference position upon locating a microscopic object of said preselected kind in said optical path of said lens system; and recording the measured change in the position of said carrier and said slide from said reference position upon locating a microscopic object of said preselected kind in said optical path of said lens system, whereby the detected microscopic object may be easily found again at a later time by mounting said slide to said slide holding means or to an identical slide holding means on another microscope, positioning said reference mark in the optical path of the respective lens system, and substantially automatically shifting the carrier of the respective slide holding means to move said slide in accordance with the recorded measured change in position, and whereby said detected microscopic object may be located and relocated essentially independently of the orientation of said slide with respect to a respective microscope stage.

16. A microscope slide for use with slide holding means attachable to a stage of an optical microscope for shifting said slide to enable a visual inspection of a sample on said slide and a determination of the position of a microscopic object in said sample, said slide holding means including a frame stationary with respect to said stage and a slide carrier shiftable with respect to said frame and said stage upon a mounting of said slide holding means to said stage, said microscope being provided with a lens system having an optical path, cooperating means being provided on said slide and said carrier for positioning said slide at a fixed position and orientation with respect to said carrier, wherein:

zeroing means are provided on said slide for establishing an x-y coordinate system reference position of said carrier with respect to said frame, said zeroing means including exactly one x-y coordinate system reference mark integral with and essentially permanently disposed on said slide and separate from said sample and viewable by an observer through the lens system upon a mounting of said slide to said carrier and upon an adjusting of the position thereof with respect to the microscope so that said reference mark is disposed in the optical path.

17. In a combination of a microscope slide and slide holding means attachable to a stage of an optical microscope for shifting said slide to enable a visual inspection of a sample on said slide and a determination of the position of a microscopic object in said sample, said slide holding means including a frame stationary with respect to said stage and a slide carrier shiftable with respect to said frame and said stage upon a mounting of said slide holding means to said stage, said slide being removably mountable to said carrier, said microscope being provided with a lens system having an optical path, the improvement wherein:

shifting means are operatively connected to the slide holding means for automatically shifting the carrier with respect to the frame and to the microscope stage along a preprogrammed meander path;

cooperating means are provided on said slide and said carrier for positioning said slide at a fixed position and orientation with respect to said carrier;

zeroing means are provided on said slide for establishing an x-y coordinate system reference position of said carrier with respect to said frame, said zeroing means including exactly one x-y coordinate system reference mark integral with and essentially permanently disposed on said slide and separate from said sample and viewable by an observer through the lens system upon a mounting of said slide to said carrier and upon an adjusting of the position thereof with respect to the microscope so that said reference mark is disposed in the optical path; and monitoring means are operatively connected to the slide holding means for measuring changes in the position of said carrier from said reference position and relative to said frame, whereby a detected microscopic object may be found easily again at a later time by mounting said slide to said carrier, positioning said reference mark in the optical path of said lens system, and operating said carrier to move said slide in accordance with a change in position detected by said monitoring means and recorded upon first locating the microscopic object and whereby said detected microscopic object may be located and relocated essentially independently of the orientation of said carrier with respect to the microscope stage.

18. The improvement defined in claim 17 wherein said reference mark includes a circle.

19. The improvement defined in claim 18 wherein said reference mark further includes a dot at the center of said circle.

20. The improvement defined in claim 19 wherein said reference mark further includes a pair of line segments disposed along respective radii of said circle.

21. The improvement defined in claim 17 wherein said reference mark includes a pair of crossed line segments.

22. An assembly for use with an optical microscope in visually detecting the presence of a microscopic object in a sample add determining the position of said object in said sample to enable repeated visual observation of said object, said microscope having a microscope stage and an objective lens system with an optical path, said assembly comprising:

a microscope object slide bearing the sample;

slide holding means removably attachable to the microscope stage in a plurality of alternative positions with respect to said stage for shifting said slide along a preprogrammed meander path to enable a visual inspection of said sample, said slide holding means including a frame stationary with resect to said stage and a slide carrier automatically shiftable with respect to said frame and said stage;

cooperating means on said slide and said carrier for mounting said slide to said carrier and for positioning said slide at a predeterminable fixed position and orientation with respect to said carrier;

monitoring means operatively connected to said slide holding means for measuring changes in the position of said carrier relative to said frame; and zeroing means on said slide for establishing an x-y coordinate system reference position of said carrier with respect to said frame, said zeroing means including an x-y coordinate system reference mark integral with and essentially permanently disposed on said slide and separate from said sample and viewable by an observer through the lens system upon a mounting of said slide to said carrier and upon an adjusting of the position thereof with respect to said microscope so that said reference mark is disposed in said optical path, whereby a detected microscopic object may be easily found again at a later time by remounting said slide to said carrier, repositioning said reference mark in the optical path of said lens system, and operating said carrier to move said slide in accordance with a change in position detected by said monitoring means and recorded upon first locating the microscopic object and whereby said defected microscopic object may be located and relocated essentially independently of the orientation of said slide with respect to the microscope stage upon a mounting of said slide to said carrier.

23. The assembly defined in claim 22, further comprising memory means operatively connected to said monitoring means for automatically storing the position of said carrier with respect to said frame upon the disposition of said reference mark in said optical path, further comprising manually operable switch means operatively connected to said memory means for initiating automatic storage thereby.

* * * * *